W. F. BOUCHÉ AND E. J. BLAKE.
TURBOGENERATOR.
APPLICATION FILED OCT. 30, 1918.
1,420,076.
Patented June 20, 1922.
2 SHEETS—SHEET 1.
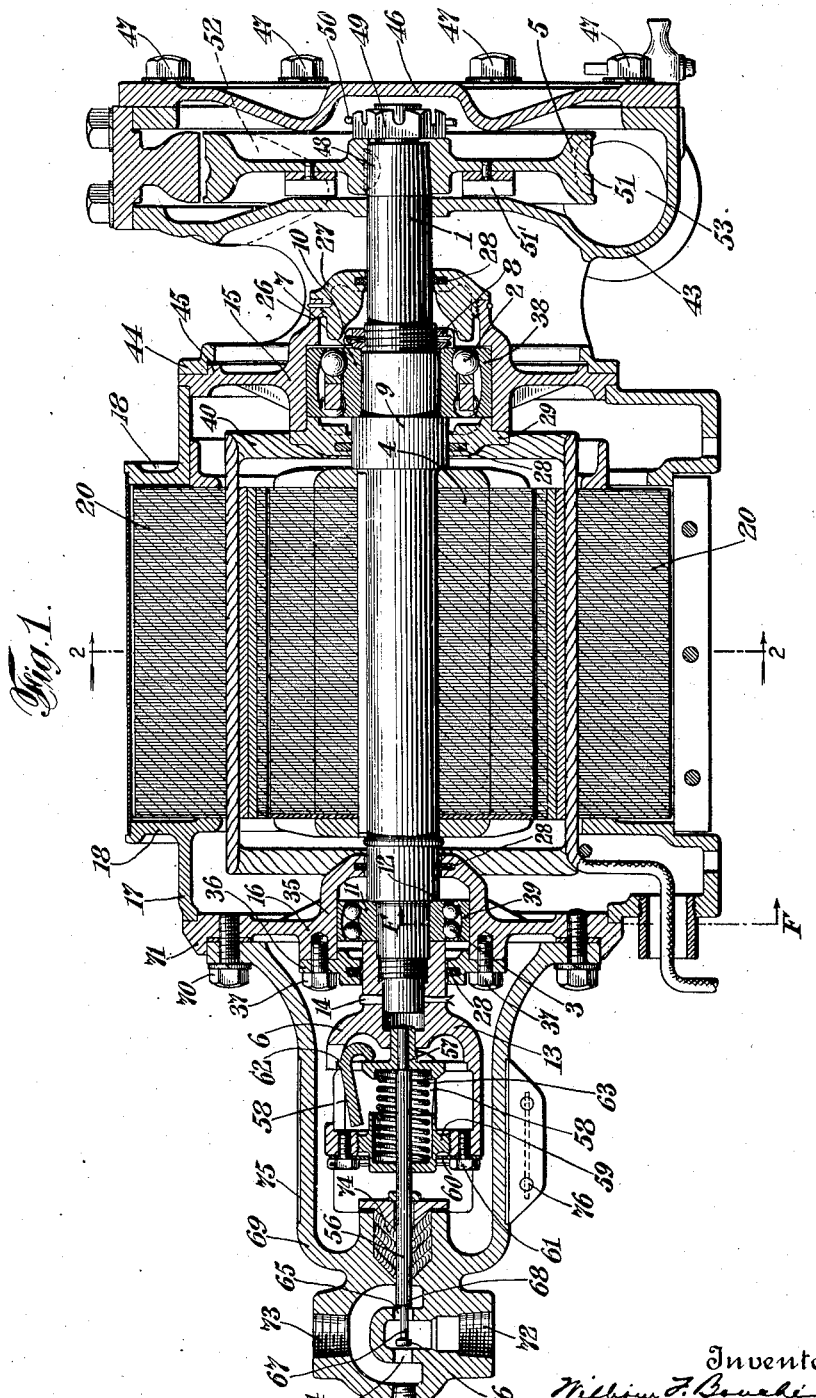

W. F. BOUCHÉ AND E. J. BLAKE.
TURBOGENERATOR.
APPLICATION FILED OCT. 30, 1918.
1,420,076.
Patented June 20, 1922.
2 SHEETS—SHEET 2.
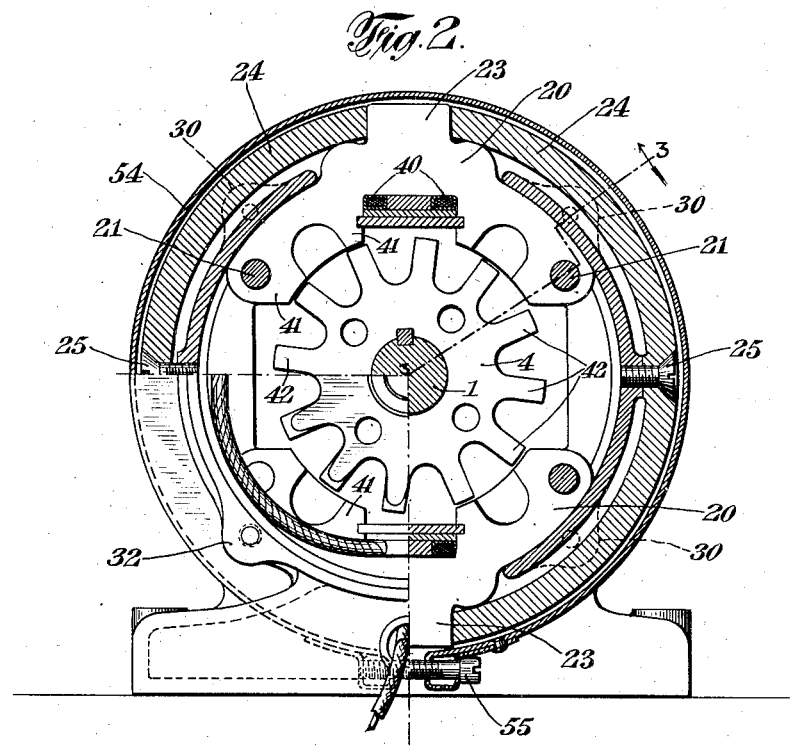
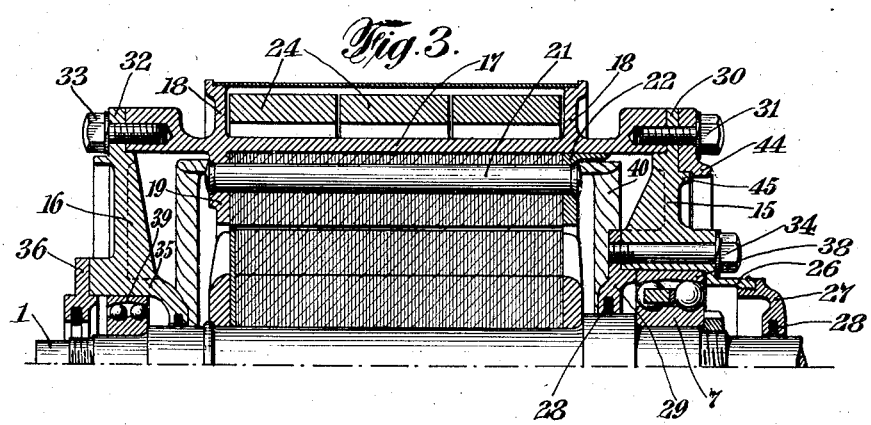

UNITED STATES PATENT OFFICE.

WILLIAM F. BOUCHÉ, OF LANCASTER, AND ELI J. BLAKE, OF BUFFALO, NEW YORK, ASSIGNORS TO GOULD COUPLER COMPANY, A CORPORATION OF NEW YORK.

TURBOGENERATOR.

1,420,076.          Specification of Letters Patent.     Patented June 20, 1922.

Application filed October 30, 1918. Serial No. 260,286.

*To all whom it may concern:*

Be it known that we, WILLIAM F. BOUCHÉ and ELI J. BLAKE, citizens of the United States, and residents of Lancaster and Buffalo, county of Erie, State of New York, respectively, have invented certain new and useful Improvements in Turbogenerators, of which the following is a specification.

This invention relates to a mechanical construction and particularly to a construction in which three units are combined or assembled on a common shaft having only two points of support or bearings.

More particularly the invention relates to the construction of a turbo-generator for locomotive headlights and the units are a turbine, a generator and a governor for the turbine.

It was our object to design a machine of this character of small size, compact arrangement and comparatively inexpensive construction, and one in which the alignment could be easiest secured, and which machine could be readily applied to a locomotive. The machine illustrated and described below is the outcome of our efforts to the ends above indicated. The preferred form of machine which we have designed is shown in the accompanying drawings, and in which—

Fig. 1 shows a longitudinal section.

Fig. 2 shows a three-quarter section on line 2—2 of Fig. 1 and a quarter view on line F—F of Fig. 1, and Fig. 3 shows a section on line 3—3 of Fig. 2.

Referring to the drawings, it will be seen that the shaft 1 is mounted in bearings 2 and 3. Keyed to the shaft 1 is a rotor 4 of a magneto-generator. On one end of the shaft 1 is mounted a turbine runner 5 and on the other end of the shaft 1 is mounted a governor 6 for the turbine.

The bearings for the shaft may be of and well known construction, but as shown, are ball-bearings. One part 7 of the bearing 2 is placed on the shaft 1 and a ring 8 is screwed on the shaft, which is threaded, so as to force the part 7 firmly against the shoulder 9 on the shaft. The ring 8 is held in place by a cotter-pin 10 or other suitable means. The other bearing 3 has a similar part 11 on the shaft 1, and this part 11 is held in place against the shoulder 12 by the member 13 of the governor which is screwed onto the shaft and held in place by taper-pin 14.

The other part of each of the bearings is supported by frame members 15 and 16, which members also constitute the ends of the generator. Attached to the ends 15 and 16 is a cylindrical body member 17. This member is made of non-magnetic material. This member 17 has near its ends two integral upstanding flanges 18 and directly underneath the upstanding flange at one end is a flange 19 extending inwardly. Mounted in this member 17 are two pole pieces 20. These pole pieces are made up in the usual manner from steel laminations. Each of these poles is held in place by two rods 21 extending therethrough. One end of each of the rods passes through the inwardly extending flange 19 and the other passes through a non-magnetic ring 22 which is similar in shape to the flange 19 and which ring is pressed into place snugly inside the member 17 after the laminations have been put into position. The ends of the rods are riveted so as to securely hold them in place. Each of the poles 20 has a projection 23 which extends out through an elongated opening in the member 17. These projections extend outwardly substantially to the periphery of the upstanding flanges 18. In the machine illustrated the projections are diametrically opposite each other and their sides being straight are substantially parallel to each other.

Permanent steel magnets 24 are placed outside the member 17 and within the periphery of the upstanding flanges 18 and with their ends firmly against the projections 23 of the poles. These magnets are also attached to the member 17 preferably at their middle point by means of screws 25. The screws are counter-sunk and the parts are so arranged that when the ends of the magnets engage the pole projections there is a slight space between the member 17 and the middle part of the magnets so that in tightening the screws 25 the magnets are placed under compression, thereby firmly pressing their ends against the pole projections. In the machine illustrated there are three of these magnets on each side of the machine, making six altogether. Obviously the number may be changed to suit conditions. Surrounding the magnets and bearing against the upturned flanges is placed a member 54 of any suitable non-magnetic and preferably non-corrosive metal, the ends of which are held together by means of the bolts 55, as shown in Fig. 2.

The end member 15 has an outwardly extending integral flange 26 which is threaded. A ring 27 is screwed into this flange and has an oil packing 28 therein bearing against the shaft 1. There is a similar ring 29 secured to a similar flange on the member 15 by bolts 34 (see Fig. 3). The ring 29 also carries an oil packing 28. This end member 15 has four projections 30, preferably at 90° apart, which engage the body member 17 of the generator frame as shown in Fig. 3. The projections 30 are fastened to the member 17 by means of bolts 31. The other end member 16 of the generator has similar projections 32 which are fastened to the member 17 by means of bolts 33.

The end member 16 has a flange 35 which is provided with an oil packing 28 and which contacts with the shaft 1. This member is also provided with a ring 36 which is held in place thereon by means of bolts 37. This ring 36 also has an oil packing 28. The other member 38 of the ball-bearing 2 is carried by the end member 15, as shown in Figs. 1 and 3; likewise the other member 39 of the bearing 3 is carried by the member 16.

The pole pieces 20 are provided with a slot in which the coils 40 are placed. These poles are also provided with teeth 41. The rotor 4 is also provided with teeth 42, and the ends of the rotor teeth and the ends of the stator or pole teeth are cut concentric with the center of the shaft 1, so that upon rotation the ends of these teeth are placed in very close relation. The pitch of the stator teeth is the same as the pitch of the rotor teeth, but the teeth on the opposite sides of the poles are separated from each other a distance equal to an odd multiple of half the pole tooth pitch, so that when the rotor teeth are aligned with the pole teeth on one side of the pole the teeth of the rotor will be midway between the teeth on the other side of the same pole, as clearly shown in Fig. 2. The object of this arrangement is to produce a maximum flux change in the coil with a minimum rotation of the rotor, the flux changing from maximum to minimum with a rotation equal to a movement of the rotor through a half tooth pitch.

The turbine has a casing 43 which is carried by the generator frame. This casing has a portion 44 which is fastened to the frame member 15 by the bolts 31, as shown in Fig. 3. This member sets over a projection 45 on the member 15 and concentric with shaft 1 and therefore is properly centered and held in alignment by that arrangement, it being held in place by means of the bolts 31. This casing has on its outside a member 46 held thereon by means of bolts 47. The turbine runner 5 is held in place on the shaft 1 by a key 48 and a nut 49 screwed on the end of the shaft 1, which nut is held in place by the cotter-pin 50. This runner is provided with turbine buckets 51 and with an inlet 52 and an exhaust 53 of any well known or desirable design. The fan blades 51' are placed on the turbine wheel to make it unnecessary to provide a steam packing around the shaft 1. It will be noted that with the construction described the turbine is supported from the generator framework by a thin cylindrical integral web with large openings for the purpose of maintaining a large ventilating space between the hot turbine casing and the adjoining bearing and generator, with a small heat conducting path through the support.

The governor for the turbine is placed on the other end of the shaft 1. This governor has a member 6 which is fastened to and rotates with the shaft 1. Mounted in the member 6 is a valve member 56 which is arranged in axial alignment with the shaft 1. This member 56 is carried at one end by a member 57, which is mounted in the member 6 and which is so mounted as to have longitudinal movement relative thereto. The member 6 also carries a suitable number of centrifugal elements 58, there being three in the governor shown. Mounted on the end of the member 6 is a member 59, the same being screw-threaded into the member 6. Outside of the member 59 is a disk 60 which is secured to the end of the member 6 by means of bolts 61. The member 59 has a chambered interior in which is placed a spiral spring 63, the same surrounding the valve member 56 and having its other end placed in a chambered recess in the member 57. The member 59 is rigid with respect to the member 6, whereas the member 57 is so arranged as to permit of longitudinal movement with respect to the member 6. The centrifugal members 58 are fulcrumed at 62 so that as the speed of the shaft 1 increases, the straight ends of the member 58 fly outwardly and the curved ends will move in a clockwise direction thereby pressing against the member 57 and compressing the spring 63 causing the valve member 56 to move to the left. The member 56 at its left-hand end cooperates with steam inlet ports 64 and 65.

On the very end of the member 56 is a button 66 which cooperates with the port 64 to control the steam flow therethrough. This button 66 is connected with the other part of the member 56 by a reduced neck portion 67. The portion 68 of the member 56 cooperates with the port 65 to control the flow of steam through that port.

Surrounding the parts above described is a casing 69 which is fastened onto the generator frame member 16 by means of bolts 70. Between this frame 69 and the member 16 may be placed a shim for adjusting the relation of the valves to the steam ports. The frame 69 is machined so that it snugly fits within the projection 71 on the member 16 and when the bolts 70 are screwed up the frame is held rigidly in position. The frame 69 carries at its outer extremity the steam inlet 72 and the steam outlet 73, through which the steam supplied to the turbine passes. This frame also carries a steam packing 74 which surrounds the member 56 to prevent the leakage of steam into the governor.

Surrounding the frame 69 is a non-corrosive metal band 75, the same being held in place by bolts 76.

From the foregoing description and the attached drawings, it is believed that a clear understanding of our invention will be obtained. Obviously many detail changes made be made in the units themselves or in the specific manner in which the various units are combined without departing from the spirit of our invention. We, therefore, do not desire to be limited by the exact details shown and described.

Having fully described our invention, what we claim as new and desire to secure by Letters Patent is:

1. The combination of an electric generator, with its driving shaft, a turbine driving the shaft and a centrifugal governor with its valve for regulating the turbine, the generator being provided with a framework supporting all three units, the turbine runner being rigidly connected to the shaft on one side of the generator, and the centrifugal governor being directely connected to the shaft on the other side of the generator, and said shaft having only two sets of bearings, one set between the turbine and generator and the other set between the centrifugal governor and valve and the generator.

2. The combination of an electric generator, with its driving shaft, a turbine driving the shaft and a centrifugal governor with its valve for regulating the turbine, the generator being provided with a framework supporting all three units, the turbine runner being rigidly connected to the shaft on one side of the generator, and said shaft having only two sets of bearings, one set between the turbine and generator and the other set between the centrifugal governor and valve and the generator, a removable housing for the turbine supported by the generator framework and a removable housing for the governor also supported directly by the generator framework, said last mentioned housing carrying the governor valve.

3. The combination of an electric generator, with its driving shaft, a turbine driving the shaft and a centrifugal governor with its valve for regulating the turbine, the generator being provided with a framework supporting all three units, the turbine runner being rigidly connected to the shaft on one side of the generator, and the centrifugal governor being directly connected to the shaft on the other side of the generator, and said shaft having only two sets of bearings, one set between the turbine and generator and the other set between the centrifugal governor and valve and the generator, a removable housing for the turbine supported by the generator framework and a removable housing for the governor also supported directly by the generator framework, said last mentioned housing carrying the governor valve, and a conduit for the fluid medium for driving the turbine, said conduit extending from the governor housing at one end of the apparatus to the turbine housing at the other end of the apparatus.

4. The combination of an electric generator, with its driving shaft, a turbine driving the shaft and a centrifugal governor with its valve for regulating the turbine, the generator being provided with a framework supporting all three units, the turbine runner being rigidly connected to the shaft on one side of the generator, and the centrifugal governor being directly connected to the shaft on the other side of the generator, and said shaft having only two sets of bearings, one set between the turbine and generator and the other set between the centrifugal governor and valve and the generator, said generator framework having end members constituting the bearing housings, and removable housings for the turbine and the governor, secured respectively to the outer faces of said end members, said end members and housings having interlocking concentric coacting seating surfaces.

5. The combination of an electric generator, with its driving shaft, a turbine driving the shaft and a centrifugal governor with its valve for regulating the turbine, the generator being provided with a framework supporting all three units, the turbine runner being rigidly connected to the shaft on one side of the generator, and the centrifugal governor being directly connected to the shaft on the other side of the generator, and said shaft having only two sets of bearings, one set between the turbine and generator and the other set between the centrifugal governor and valve and the generator, and a casing for the turbine having a thin cylindrical web portion integral therewith secured to one end of said framework, arranged to position the turbine away from the adjacent bearing, with a large ventilating space between the bearing and the body portion of said casing and to provide a comparatively small metallic heat conducting path between the same.

In testimony whereof, we have signed our names to this specification.

WILLIAM F. BOUCHÉ.
ELI J. BLAKE.